UNITED STATES PATENT OFFICE.

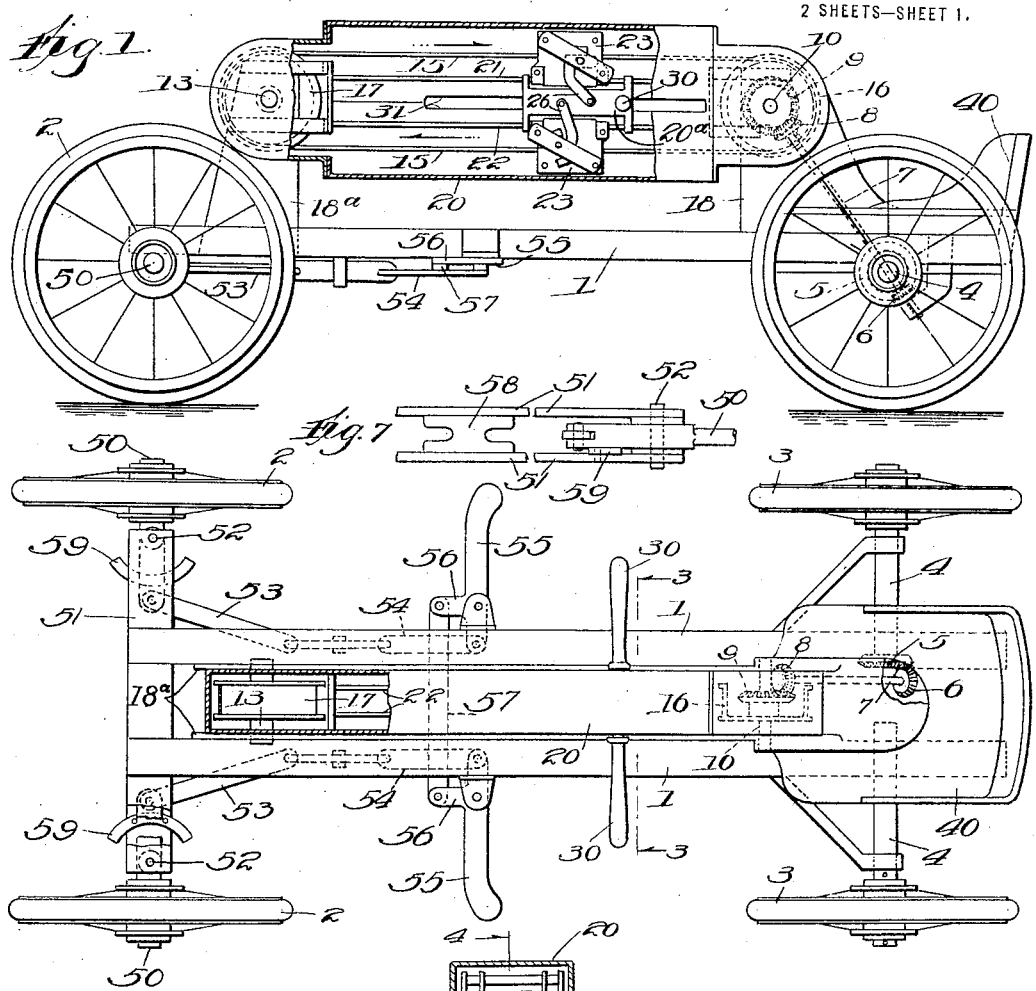
C. DAHL.
OCCUPANT OPERATED VEHICLE.
APPLICATION FILED MAR. 13, 1920.
1,412,276. Patented Apr. 11, 1922.
2 SHEETS—SHEET 1.

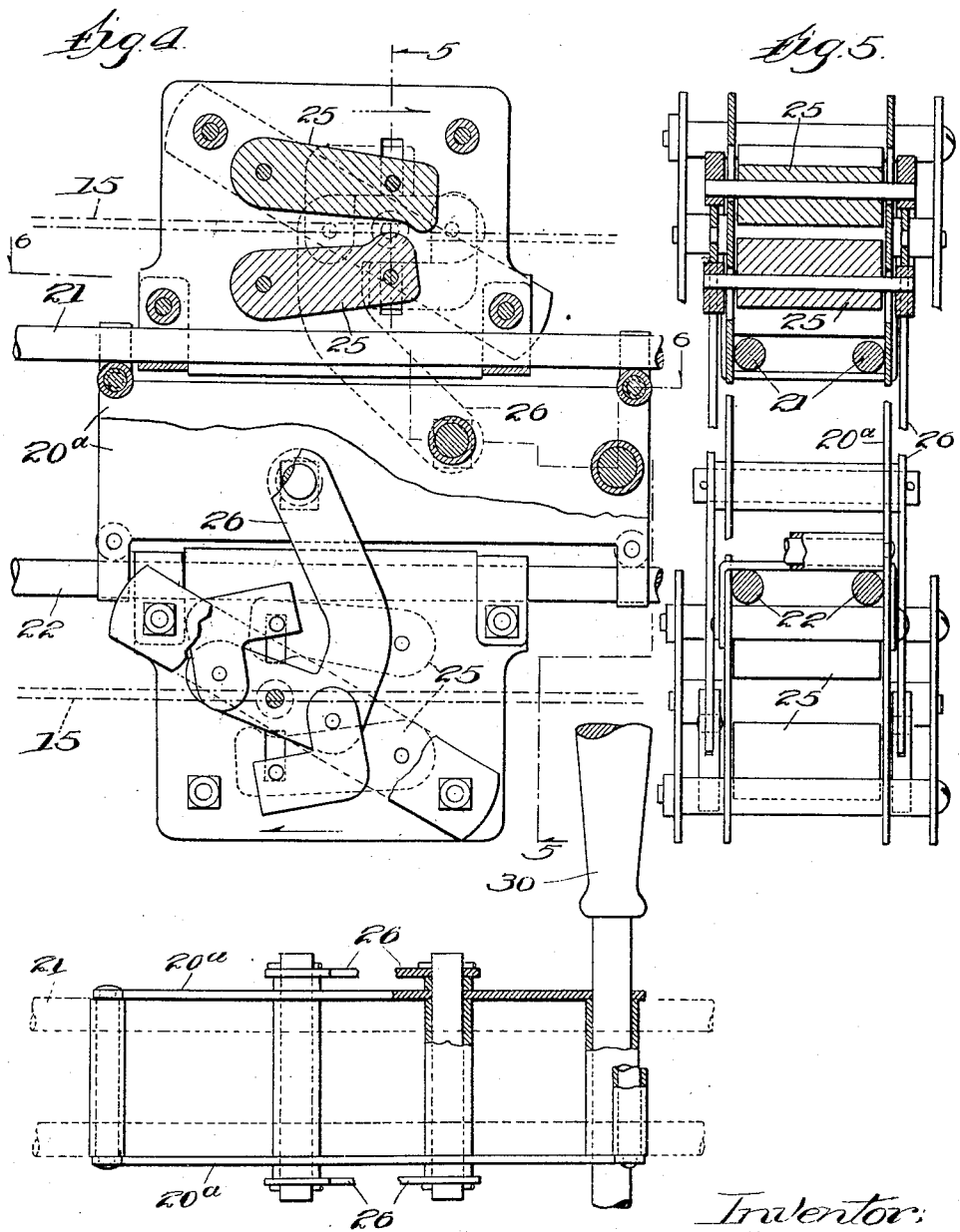

CONRAD DAHL, OF CHICAGO, ILLINOIS.

OCCUPANT-OPERATED VEHICLE.

1,412,276.

Specification of Letters Patent.   Patented Apr. 11, 1922.

Application filed March 13, 1920. Serial No. 365,443.

*To all whom it may concern:*

Be it known that I, CONRAD DAHL, a citizen of the United States, residing at Chicago, in the county of Cook and State of Illinois, have invented certain new and useful Improvements in Occupant-Operated Vehicles, of which the following is a specification, reference being had to the accompanying drawings, forming a part thereof.

The purpose of this invention is to provide an improved construction of an occupant-operated vehicle, particularly adapted for the purpose of a child's cart. It consists in the elements and features of construction shown and described, as indicated in the claims.

In the drawings:

Figure 1 is a side elevation of a vehicle embodying the present invention, having the casing of the operating structure partly broken away to disclose the said operating structure.

Figure 2 is a plan view of the vehicle with the operating means, the casing being broken away to disclose said operating means in part.

Figure 3 is a section at the line, 3—3, on Figure 2.

Figure 4 is a section at the line, 4—4, on Figure 3.

Figure 5 is a section at the line, 5—5, on Figure 4.

Figure 6 is a detail top plan view of a portion of the structure shown in Figure 4, certain parts being broken away, and others shown in section at the line, 6—6, on Figure 4.

Figure 7 is a detail elevation of the rigid front axle and the steering wheel spindle at one end thereof.

In the structure shown in the drawings, the vehicle frame is represented by longitudinal bars, 1, 1, supported by steering wheels, 2, 2, at the front and propelling wheels, 3, 3, at the rear. The construction and mounting of the forward wheels is substantially as shown in my pending application, Serial No. 363,047, filed March 3, 1920, being that the steering wheel spindles, 50, 50, are pivoted to the fixed axle bars, 51, 51, intermediate the ends of said spindles at 52, 52, and have their inner ends connected by links, 53, 53, and 54, 54, with steering pedal levers, 55, 55. Said steering pedal levers have forwardly projecting arms, 56, 56, which are connected by transverse links, 57, for transmitting and equalizing the turning movement. In the present construction, differing from that of my said pending application, the fixed axle comprises two horizontal members 51, 51, spaced apart and secured together at the middle of their length by a block or bolts, 58, the spindles, 50, being interposed between said flat bars for pivoting to them as seen in Figure 7. For staying the steering connections in their horizontal plane, there is desirably provided a segment, 59, of the nature of a fifth-wheel secured transversely upon the lower bar, 51, of the rigid axle, on which segment the inwardly-extending end of the steering wheel spindle ride in the swinging of the spindle for turning the wheel for steering.

The propelling wheels, 3, 3, are mounted on independent but transversely aligned axles, 4, 4, journaled in the frame, one of them having a beveled gear, 5, at its inner end driven by means of a pinion, 6, on an obliquely positioned shaft, 7, having a beveled pinion, 8, at its upper forward end, meshing with and driven by a beveled gear, 9, on a counter-shaft, 10, which is journaled on the frame, and provided with an actuating device. Said actuating device comprises an endless belt, 15, traveling around pulleys, 16 and 17, on the shafts, 10 and 13, respectively, the shaft, 10, before mentioned being journaled in standards, 18, erected on the frame bars, 1, 1, the shaft, 13, being journaled on similar standards, 18ª, erected at the forward end of the frame upon said frame bars. A casing, 20, encloses the belt, 15, and the pulleys by which it is carried. On said casing extending parallel to the two plies of the belt, respectively, and spaced apart from each other are mounted longitudinally-extending guide-rods, 21, 22, for clutch devices, 23, 23, which are identical in form but reversed in position for engaging the two plies of the belt respectively. The clutch for engaging the lower ply of the belt is adapted for engaging it by forward movement of the clutch, and the clutch for engaging the upper ply is adapted for engaging it by rearward movement, each of the clutches being adapted for releasing the belt upon movement opposite to their engaging movement. The construction of these clutches is identically that which is shown in my co-pending application, Serial No. 363,047, filed March 3, 1920, and may be understood sufficiently for the purpose of this application without description of the drawings showing the same, beyond pointing out that each clutch comprises two grippers, 25, 25, which are actuated for gripping the ply of the belt which travels between them by levers, 26, and that said levers are pivotally engaged at their inner ends,—the upper end of the lever from the lower clutch, and the lower end of the lever from the upper clutch,—with the operating handle bar, 30, which extends through the casing being mounted for sliding fore-and-aft in slots, 31, formed in the opposite sides of the casing and provided with hangers, 20ª, by which it is mounted for sliding on the guide rods, 21.

The operator occupying the seat, 40, mounted upon the frame and having his feet extended at opposite sides of the rear standards, 18, the casing, 20, extending between his knees and his feet in position for controlling the steering devices, grasps the opposite ends of the handle bar with his two hands and operates it with a movement similar to that of a rower operating the oars of a row boat. The rearward or pulling movement will be the main operating movement of power stroke, pulling rearward the upper ply of the belt, 15, while the lower clutch slides released upon the lower ply. The forward movement may also be an operating movement; but so far as the operator is concerned it may be practically an idle movement, the lower clutch in that movement being engaged with the lower ply and propelling it for driving the vehicle, only if the operator's forward movement is rapid enough to a little more than keep up with the forward movement of said lower ply resultant from the previous propelling movement and the momentum of the vehicle, while the upper clutch slides with respect to the upper ply of the belt or permits the belt to glide through it, without engagement.

I claim:—

1. In an occupant-operated vehicle in combination with a frame structure and an occupant's seat thereon, propelling wheels and driving means therefor comprising an endless belt and pulleys about which the belt travels, said belt and pulleys being mounted wholly in front of the seat and above the level thereof, driving connections from one of the pulleys to a propelling wheel, and belt-actuating means consisting of a clutch for engaging one ply of the belt, adapted for such engagement upon movement along the belt in one direction and for releasing the belt by movement in the opposite direction there-along; a track on which said clutch is mounted for movement bodily along the belt, and a handle for manually reciprocating the clutch along the track.

2. In the construction defined in claim 1, foregoing, the driving connections to a propelling wheel being made from the rear one of the endless belt pulleys and extending down to reach a rear propelling wheel at a position forward of the position of the occupant's seat.

3. In the construction defined in claim 1, a casing which encloses the two plies of the belt, its carrying pulleys and the clutches, the clutch track being carried on the casing, said casing having slots for the handle-bar.

4. In the construction defined in claim 1, a casing which encloses the two plies of the belt, its carrying pulleys and the clutch, the clutch track being carried on the casing, and the handle-bar having bearings by which it is mounted for sliding longitudinally of the path of movement of the belt.

In testimony whereof, I have hereunto set my hand at Chicago, Illinois, this 10th day of March, 1920.

CONRAD DAHL.